April 25, 1933.  F. H. KAYLER  1,905,641
COUPLER
Filed July 18, 1930
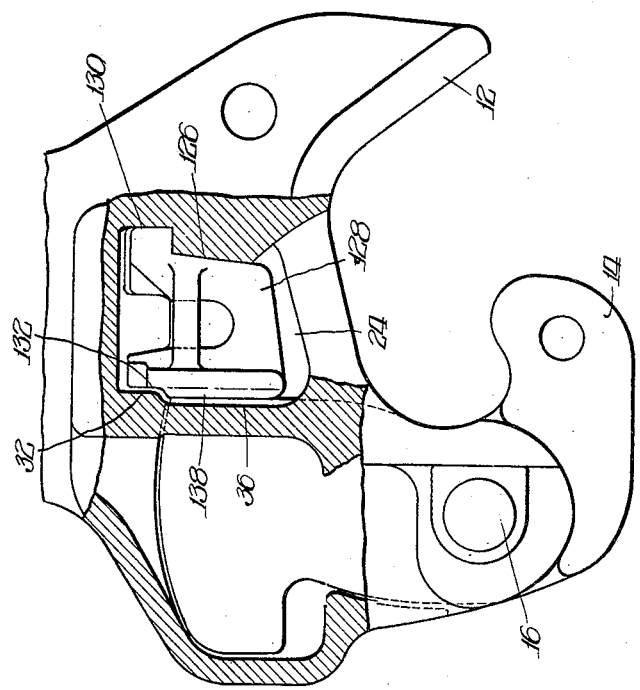
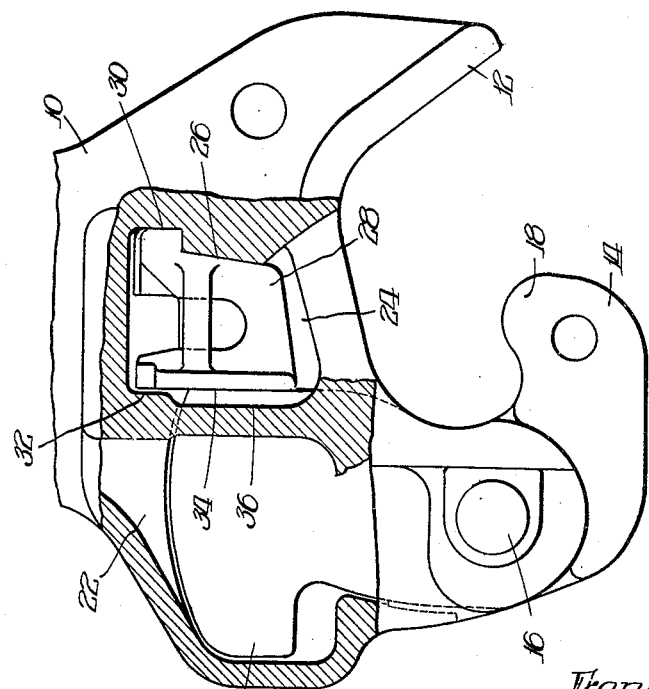
Inventor:
Frank H. Kayler, Patented Apr. 25, 1933

1,905,641

UNITED STATES PATENT OFFICE

FRANK H. KAYLER, OF ALLIANCE, OHIO, ASSIGNOR TO AMERICAN STEEL FOUNDRIES, OF CHICAGO, ILLINOIS, A CORPORATION OF NEW JERSEY

COUPLER

Application filed July 18, 1930. Serial No. 468,778.

This invention pertains to couplers, and more particularly to a method of construction permitting ready and inexpensive repair or adjustment of coupler devices.

After the A. R. A. type of coupler has been in use for various lengths of time, the contour lines of the coupler are found to have loosened up or changed due to the seating of the various cast surfaces of the coupler body and parts and to the wear incident to service. Interstate Commerce Commission rulings specify that the gauge of couplers shall be a certain amount, so that after the coupler has loosened to a certain degree it is necessary either to replace the coupler with a new one or to tighten the contour of the coupler in service. It has been found that the wear is usually well distributed on the bar and parts, and therefore it is not always possible to tighten the contour the desired amount by the simple application of a new lock or knuckle of the standard design, and it will be readily appreciated that in making this repair or replacement it is desirable to repair or replace as few parts as possible.

The present practice is to build up the locking face of the knuckle by weld, to rotate the knuckle back and pull the nose of the knuckle inwardly and toward the guard arm, thereby reducing the gauge, which is the distance between the knuckle nose and the guard arm. It will be appreciated that special new repair knuckles might be made with the required extra metal cast on the new locking face, but the cost of a new knuckle is quite considerable, and it is not particularly desirable to apply a new knuckle for the reason that the old knuckle is "worn in" to fit the particular coupler body, so that the old knuckle has been found to give maximum bearing area on pulling lugs, buffing shoulders, pin protectors, and other parts.

In the present coupler constructions it is not possible to obtain the same results as obtained by a new coupler by welding on the locking face of the lock or using a heavier lock, for the reason that the chamber in the top of the coupler head into which the lock is lifted in unlocked position is made a substantially close fit for the lock, and has guiding surfaces which cooperate with the locking face of the lock to insure proper operation thereof. The fitting of the coupler with a new lock of increased thickness therefore, or one built up by welding, is not entirely possible without modification of the coupler head, as such a lock would not pass up into and operate freely into the lock chamber.

It is therefore an object of this invention to provide a coupler construction wherein suitable repair can readily be effected for reducing the gauge of a worn coupler wherein the repaired coupler will operate in a manner as satisfactory as a new coupler.

Another object of the invention is to provide a coupler construction wherein the parts cooperate in proper guiding relation to effect proper operation of the coupler, but wherein certain parts may be later applied to be equally effective in guiding operation.

A further object of the invention is to provide a coupler construction which is efficient in operation, inexpensive to make and maintain, and fulfills all requirements of manufacture and service.

With these and various other objects in view, the invention may consist of certain novel features of construction and operation, as will be more fully described and particularly pointed out in the specification, drawing and claims appended hereto.

In the drawing, which illustrates an embodiment of the device and wherein like reference characters are used to designate like parts—

Figure 1 is a fragmentary sectional top plan view of a coupler construction embodying the invention showing a new coupler with a lock of standard thickness; and Figure 2 is a fragmentary sectional top plan view of the coupler construction illustrated in Figure 1 having the new lock added in repair.

Referring first of all to the coupler construction in general, the coupler head 10 is provided with a guard arm 12 and a knuckle 14 pivotally mounted as at 16 to the coupler head, the knuckle being provided with the nose 18 defining the gauge of the coupler as measured from the nose substantially perpendicularly to the guard arm 12. The knuckle is provided with the portion 20 extending into the cavity 22 formed in the coupler head, a portion of the member 20 extending into the lock cavity 24.

In the form of lock cavity shown, there is provided a guide surface 26 having cooperative engagement with a complementary side formed on the lock 28, the guide surface 26 communicating with the stepped guide surface 30 having cooperative relation with the complementary surface provided on the lock. There is also provided an opposite guide surface 32 of the cavity having cooperative relation with a surface or locking face area 34 of the lock, and as the surface 34 also has cooperative engagement with a surface formed on the member 20, the surface 32 is discontinued and offset as at 36; that is, clearance is provided between the surfaces 36 and 34.

After a worn condition has developed, the lock 28 is removed, and a new lock 128 is added, the lock being provided with surfaces 126 and 130 corresponding to the surfaces 26 and 30, and a surface 132 having cooperative relation with the surface 32 of the lock cavity 24. The new lock, however, is provided with additional metal, as at 138, providing ample clearance between this portion of the lock and the surface 36, but being sufficient to depress the member 20 of the knuckle to maintain gauge between the knuckle nose and the guard arm thereof and to tighten the contour, ample clearance being maintained in the top lock chamber between the metal 138 and the wall 36 to permit the lock to rest freely without any interference. The contour of the present coupler is "tightened" by decreasing the distances between the knuckle and the coupler head, as for example between the knuckle nose and face of coupler or between the knuckle nose and guard arm.

With this construction it will be appreciated that an inexpensive method of repair is provided, yet one which is very effective in producing the desired result without sacrificing any operativeness of the repaired coupler, and it is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a coupler, the combination of a coupler head, a knuckle pivotally mounted on said head, a lock for said knuckle, a lock cavity in said head for receiving said lock, said cavity having oppositely disposed walls provided with guide surfaces cooperating with said lock throughout movement of said lock between locked and unlocked positions, one of said walls having a guide surface opposite the locking face of said knuckle, the other of said walls having a portion disposed forwardly of the guide surface thereof and at a greater distance from the guide surface opposite said locking face than said last-mentioned guide surface whereby a lock of increased width may be substituted for said normal lock to maintain the gauge of said coupler when worn.

2. In a coupler, the combination of a coupler head, a knuckle pivotally mounted on said head, a lock for said knuckle, a lock cavity in said head for receiving said lock, said cavity having oppositely disposed walls provided with guide surfaces cooperating with said lock throughout movement of said lock between locked and unlocked positions, one of said walls having a guide surface opposite the locking face of said knuckle, the other of said walls having a portion disposed at a greater distance from the guide surface opposite said locking face than the guide surface thereof whereby a lock of increased width may be substituted for said normal lock to maintain the gauge of said coupler when worn.

3. In a coupler, the combination of a coupler head, a knuckle pivotally mounted on said head, a lock for said knuckle, a lock cavity in said head for receiving said lock, said cavity having oppositely disposed walls provided with guide surfaces cooperating with said lock, one of said walls having a portion disposed forwardly of the guide surface thereof and at a greater distance from the opposite wall at the knuckle bearing surface than the normal width of a lock at the knuckle bearing surface whereby a lock of increased width may be substituted for said normal lock to maintain the gauge of said coupler when worn.

4. In a coupler, the combination of a coupler head, a knuckle pivotally mounted on said head, a lock for said knuckle, a lock cavity in said head for receiving said lock, said cavity having oppositely disposed walls provided with guide surfaces cooperating with said lock, one of said walls having a portion disposed at a greater distance from the opposite wall at the knuckle bearing surface than the normal width of a lock at the knuckle bearing surface whereby a lock of increased width may be substituted for said normal lock to maintain the gauge of said coupler when worn.

5. In a coupler, the combination of a coupler head, a knuckle pivotally mounted on said head, a lock for said knuckle, a lock cavity in said head for receiving said lock, said cavity having oppositely disposed walls, one of said walls having a guide surface opposite the locking face of said knuckle and cooperating with said lock throughout movement of said lock between locked and unlocked positions, the other of said walls having a portion cooperating with said lock throughout movement of said lock between locked and unlocked positions, and another portion disposed at a greater distance from said guide surface than said last-named portion.

6. In a coupler, the combination of a coupler head, a knuckle pivotally mounted on said head, a lock for said knuckle, a top lock cavity in said head for receiving said lock, said cavity having oppositely disposed walls, one of said walls having a portion disposed in opposite relation to the locking face of said knuckle and cooperating with said lock throughout movement of said lock between locked and unlocked positions, the other of said walls having a portion cooperating with said lock throughout movement of said lock between locked and unlocked positions and another portion disposed forwardly of said last-mentioned portion and at a greater distance from said portion of said opposite wall than said last-named portion.

Signed at Alliance, Ohio, this 11th day of July, 1930.

FRANK H. KAYLER.